UNITED STATES PATENT OFFICE.

FRANK GRUBER, OF NEWARK, NEW JERSEY.

PROPELLING DEVICE FOR VEHICLES.

SPECIFICATION forming part of Letters Patent No. 578,329, dated March 9, 1897.

Application filed February 29, 1896. Serial No. 581,323. (No model.)

*To all whom it may concern:*

Be it known that I, FRANK GRUBER, a citizen of the United States, residing at Newark, in the county of Essex and State of New Jersey, have invented certain new and useful Improvements in Propelling Devices for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in vehicles of that class which are driven by manual power through a system of gearing; and the invention has for its object to provide a simple, durable, and effective machine the operation of which can be readily governed and the machine worked with ease and rapidity.

The invention therefore consists in the general arrangements, construction, and combinations of parts, such as will be hereinafter fully described, and finally embodied in the clauses of the claim.

The invention is clearly illustrated in the accompanying sheets of drawings, in which—

Figure 1 is a plan, and Fig. 2 a side view, of the vehicle embodying the principles of the present invention. Fig. 3 is a front view of the propelling mechanism connected with the vehicle. Figs. 4 and 5 are horizontal sections, taken on line $x$ in Fig. 3, illustrating the propelling mechanism in two different positions—when the vehicle is being propelled in a straight direction and when the vehicle is being propelled on a curve. Fig. 6 is a vertical section, on an enlarged scale, of the forward axle of the vehicle and part of the propelling mechanism, said view illustrating the manner of carrying the wagon-body on hubs connected with the wheels of the vehicle to remove all undue weight directly from the forward axle of the vehicle. Fig. 7 is a side view of one of the forward wheels of the vehicle. Fig. 8 is a side view of a wheel-casing of the construction illustrated in Fig. 7, which is provided on its periphery with small rollers; and Fig. 9 is a cross-section of the same.

Similar letters of reference are employed in all of the above-described views to indicate like parts.

In said drawings, $a$ represents the body of a wagon or other like vehicle, provided with the usual forms of rear wheels $a'$ and a seat $a^2$. Fixed to the under side of the body of the vehicle by means of a bolt $a^3$ is a reach or tongue $a^4$, to which is fastened a suitable supporting-bracket $a^5$, having a pedestal-bearing $a^6$. In said bearing $a^6$ and rotatively arranged in a suitable hole or perforation in the reach or tongue $a^4$ is a steering-rod $b$, provided at the top with a handle $b'$ or the equivalent thereof, and at or near its lower end said rod $b$ is provided with a sprocket-wheel $b^2$, as clearly illustrated in Fig. 2. The front end of the tongue or reach $a^4$ is pivotally connected by means of a screw or bolt $c$ with a suitable support $c'$, secured by means of bolts or screws $c^2$ to a cross-bar $c^3$ of the main frame $c^4 c^5 c^4$ for carrying the propelling mechanism. The side pieces $c^4$ of said frame are provided with annular hubs $c^6$, extending from the sides thereof, which project into suitable hubs or bearing portions $i^7$ on the front wheels of the vehicle, in the manner and for the purposes to be more fully set forth hereinafter. Rotatively, but loosely, arranged in said hubs or bearing portions $i^7$ and extending through the said hubs $c^6$ in the side pieces $c^4$ of the main frame is the front axle $e$ of the vehicle.

The support $c'$, as will be seen from Fig. 6, is provided with certain holes $c^8$, in which I have loosely fitted a sleeve $d$ in sliding contact with the said axle $e$, for the purposes to be more fully set forth hereinafter. As will be seen from Figs. 2, 4, 5, and 6, there is pivotally secured to said cross-bar $c^3$, on a pin or bolt $c^9$, a brace $a^7$, which extends backwardly and upwardly and is secured to the under side of the body of the vehicle. Said frame $c^4 c^5 c^4$ may be braced by means of certain uprights $f$, from which extend suitable arms $f'$, terminating in a pin $f^2$, which extends through a hole in the top bar $c^5$ of the said frame and which is operatively held in said hole by means of a nut $f^3$, as will be (No Model.)  2 Sheets—Sheet 2.
F. A. HALSEY.
PNEUMATIC PUMP.
No. 578,330.  Patented Mar. 9, 1897.
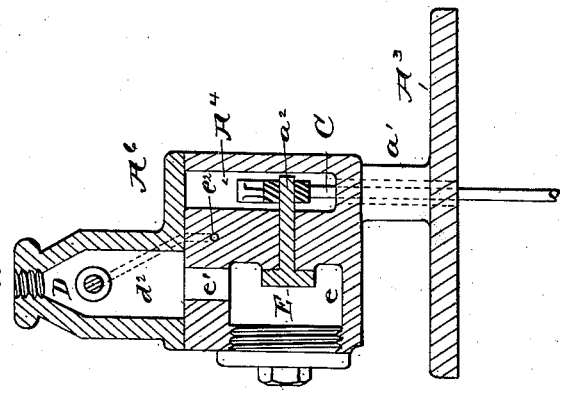
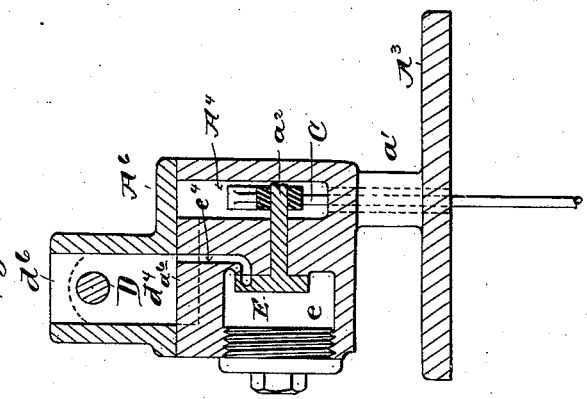
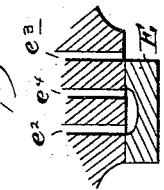
WITNESSES:
C. W. Benjamin
A. T. Fales
INVENTOR
Frederic A. Halsey
BY Arden J. Fitch
ATTORNEY

UNITED STATES PATENT OFFICE.

FREDERIC A. HALSEY, OF SHERBROOKE, CANADA.

PNEUMATIC PUMP.

SPECIFICATION forming part of Letters Patent No. 578,330, dated March 9, 1897.

Application filed December 26, 1891. Serial No. 416,126. (No model.)

*To all whom it may concern:*

Be it known that I, FREDERIC A. HALSEY, a citizen of the United States, residing at Sherbrooke, Province of Quebec, Dominion of Canada, have invented certain new and useful Improvements in Pneumatic Pumps, of which the following is a full, clear, and exact description, reference being had to the accompanying drawings, forming part of this specification.

My invention relates to a pump apparatus by which water is elevated or forced by air-pressure introduced into the pump and acting directly upon the surface of the water therein and without the intervention or operation within the pump of a piston or pistons.

My invention consists, primarily, in a pneumatic pump which comprises a water-chamber having a valved water inlet and outlet, an air-passage at or near the top of said chamber, a main valve governing said passage, a supplementary valve governing ports for the inlet and exhaust of live air to and from the main-valve chamber to actuate said main valve, a float in said water-chamber in operative connection with and governing said supplementary valve, and a balance-lever contained and working within a chamber in the pump and in operative connection with said supplementary valve and float; and my invention includes a pneumatic pump which comprises a water-chamber having a valved water inlet and outlet, an air-passage at or near its top, a main valve controlling said passage, and a float in said water-chamber adapted to move therein by and with the inflow and outflow of water thereto and therefrom, in combination with a supplementary valve working in a chamber in constant communication with the live-air supply and seating against and governing air-ports in said chamber-wall, a valve-operating stem extending through said live-air-chamber wall into a chamber in constant communication with said water-chamber, and a stem-operating balance-lever on said valve-stem and connected to said float.

Figure 1 is a vertical central sectional view of a pneumatic pump containing my invention. Fig. 2 is an enlarged vertical section taken through the valve-chamber shown in Fig. 1, but on a plane nearer the observer than that of the section shown in Fig. 1. Fig. 3 is an enlarged section of the valve-chamber on the line $y\,y$, Fig. 2. Fig. 4 is a similar view on the line $z\,z$, Fig. 2; and Fig. 5 is a horizontal section in detail taken across the supplementary valve and its chest on the line $x\,x$, Fig. 2.

A is the water-chamber, B its valved water-inlet, and B' its discharge or outlet, having valve $B^2$.

A' and $A^2$ are contracted necks at the top and bottom of the water-chamber.

$A^3$ is a lid to close the top of the upper neck or end of the chamber A and apertured, as shown, and a passage $a'$ leads from the chamber A to the chamber $A^4$. In the wall of chamber $A^4$ is the passage or port $a^6$, which is the air inlet and outlet in the alternate operations of the pump.

D is a main valve governing said passage $a^6$, and is preferably a piston-valve working in its chest between stops $d\,d'$ and registering with and governing ports $d^2$, $d^3$, and $d^4$, which respectively communicate with the live-air supply through a connection $d^5$, the chamber $A^4$ through passage $a^6$, and an exhaust $d^6$. These several ports surround the main valve and balance it. When the said valve is thrown to the stop $d'$, air may escape from the water-chamber A through $a'$, $A^4$, $a^6$, $d^4$, and $d^6$, and when the said valve is thrown to the stop $d$ air may enter said water-chamber through $d^5$, $d^3$, $a^6$, $A^4$, and $a'$.

C' is a float in the water-chamber A and adapted to traverse therein a rod C by and with the inflow and outflow of water to and from said chamber.

E is a supplementary or auxiliary valve which governs ports for the inlet and exhaust of live air to and from the main-valve chest to actuate said main valve. These ports are shown, one at $e^2$, which communicates with the left-hand end of said valve-chest, another at $e^3$, which communicates with the opposite end of said valve-chest, and another at $e^4$, which communicates with the exhaust $d^4$.

The valve E is preferably in the form of a disk fixed on and to be oscillated by a rock-shaft stem $a^2$ in a chamber $e$, desirably constituted in the wall of the chamber $A^4$, the said chamber $e$ being in constant communication with the live-air supply by means of a passage $e'$, leading thereto from the port $d^2$ and air-inlet $d^5$.

The ports $e^2$, $e^3$, and $e^4$ are formed in the wall of the chamber $e$, and the valve E seats against said wall and over said ports, as shown. The valve is constructed to register at its oscillation in one direction with a port $e^2$ or $e^3$ leading to an end of the chest of the main valve D and at the same time to register with the other of said ports $e^2$ or $e^3$ and the exhaust-port $e^4$. The said valve E thus always registers with the exhaust $e^4$, and in its oscillations brings first one and then the other of the ports $e^2$ and $e^3$ into communication with said exhaust, while it opens communication from the live-air supply to that one of said ports $e^2$ or $e^3$ which is not thus in communication with said exhaust.

The float $C'$ is operatively connected to the supplementary valve E to control the oscillations of said valve, and the rock-shaft stem and said float are in operative connection with a balance-lever $A^5$, which is preferably contained and works within a chamber in the pump structure. This may be conveniently accomplished by extending the rod C through the passage $a'$ into the chamber $A^4$ and extending the operative stem $a^2$ of the valve E through the wall of its chest $e$ into said chamber $A^4$, then keying said lever $A^5$ to said stem $a^2$, and pivotally connecting an arm $a^3$ of said lever to said rod C, while the opposite arm $a^4$ of said lever carries the counterweight $a^5$.

By means of this arrangement the employment of a stuffing-box on the stem or fulcrum $a^2$ of the balance-lever $A^5$, which is essential when said lever is placed outside the apparatus, is avoided, and the necessity of readjusting the counterweight on said lever to correspond to variations in the required air-pressure under different circumstances, consequent upon the employment of a stuffing-box, as stated, is obviated.

The operation of this pump is as follows: When the valve E is oscillated to the positions shown in Figs. 1 and 5, with port $e^3$ open to chamber $e$, live air will flow to right-hand end of the valve D while exhaust is taking place at the opposite end of the chest of said valve through $e^2$ $e^4$, and said valve D will thereby be shifted to the position shown in Fig. 2, thus opening communication between the live-air supply and the chamber A through $d^2$, $d^3$, $a^6$, and $A^4$. When the valve E is reversely oscillated, port $e^2$ will be in communication with chamber $e$ and live air will flow to the left-hand end of valve D, while exhaust from the right-hand end of the main valve-chest will take place through $e^3$ $e^4$, and valve D will be shifted to the right, thus cutting off communication between $d^2$ and $d^3$ and establishing it between $d^3$ and $d^4$, so that air in chamber A may exhaust through $a'$, $A^4$, $a^6$, $d^3$, and $d^4$. The inflow of water into chamber A acts to lift the float $C'$, which at or near the limit of its rise engages a stop $c$ on the rod C, thereby throwing the rod upward and consequently vibrating the balance-lever $A^5$ and thereby oscillating the valve E in one direction on its operating-stem $a^2$. The outflow of water through outlet $B'$, under admitted air-pressure, permits the float to descend in chamber A and engage a stop $c'$ on the rod C, thereby depressing the rod and reversely vibrating the lever $A^5$ and reversely oscillating the lever E.

What I claim as my invention, and desire to secure by Letters Patent, is—

In a pneumatic pump which comprises a water-chamber having a valved water inlet and outlet, an air-passage at or near its top, a main valve controlling said passage and a float in said water-chamber adapted to move therein by and with the inflow and outflow of water thereto and therefrom, in combination with a supplementary valve working in a chamber in constant communication with the live-air supply and seating against and governing air-ports in said chamber-wall, a valve-operating stem extending through said live-air-chamber wall into a chamber in constant communication with said water-chamber, and a stem-operating balance-lever on said valve-stem and connected to said float; substantially as and for the purpose specified.

FREDERIC A. HALSEY.

Witnesses:
ARDEN S. FITCH,
A. T. FALES.